United States Patent [19]

Züllig

[11] 4,449,905
[45] May 22, 1984

[54] METHOD OF AND ARRANGEMENT FOR MANUFACTURING ENCLOSED BLOCKS

[75] Inventor: Heinz Züllig, Niederweningen, Switzerland

[73] Assignee: Bucher-Guyer AG, Niderweningen, Switzerland

[21] Appl. No.: 405,874

[22] Filed: Aug. 6, 1982

[30] Foreign Application Priority Data

Aug. 26, 1981 [DE] Fed. Rep. of Germany ....... 3133663

[51] Int. Cl.³ .......................... B29C 3/04; B28B 3/24
[52] U.S. Cl. .................... 425/117; 425/125; 425/126 R; 425/127; 425/128; 425/352
[58] Field of Search ............... 264/268; 425/110, 117, 425/126 R, 125, 128, 256, 352

[56] References Cited

U.S. PATENT DOCUMENTS

| | | | |
|---|---|---|---|
| 3,072,993 | 1/1963 | McGill | 425/128 |
| 3,257,700 | 6/1966 | Thomas | 425/126 |
| 3,468,090 | 9/1969 | L'Hermite | 264/268 |
| 4,324,754 | 4/1982 | Stephenson et al. | 264/268 |
| 4,381,907 | 5/1983 | Bischlipp et al. | 425/110 |

FOREIGN PATENT DOCUMENTS

2741800  3/1979  Fed. Rep. of Germany .

Primary Examiner—Willard E. Hoag
Attorney, Agent, or Firm—Ernest F. Marmorek

[57] ABSTRACT

Blocks with a casing composed of upper and lower parts are produced by inserting the upper and lower parts in an inserting device above and below pushing elements between upper and lower pressing dies of a press, displacing by the pushing elements the lower part in a chamber of a mold towards the lower pressing die and the upper part towards the upper pressing die with self-releasable holding on the latter, withdrawing the inserting device from a pressing region between the upper and lower pressing dies, and cyclically repeating these steps in synchronism with a working stroke of the press.

9 Claims, 10 Drawing Figures

METHOD OF AND ARRANGEMENT FOR MANUFACTURING ENCLOSED BLOCKS

BACKGROUND OF THE INVENTION

The present invention relates to a method of and an arrangement for manufacturing enclosed blocks. More particularly, it relates to a method of and an arrangement for manufacturing blocks having a casing assembled from upper and lower parts, wherein the lower part is inserted into a mold chamber, the mold is filled with a filling material to be pressed, the upper part is applied, and the block is subjected to pressure between upper and lower pressing dies that engage the upper and lower parts of the block casing.

The thus manufactured refractory blocks, in which the filling material is predominantly a ceramic mass, are used for lining converters in which steel is melted from crude iron, such as Bessemer or Thomas converters. It has been recognized in the Steel industry that the casing of the individual blocks significantly increases the service life of the converter lining composed of these blocks. In accordance with a known method of manufacturing, a blockmaking press is utilized, for example as described in the German Offenlegungsschrift No. 2,741,800 (laid open Mar. 22, 1979); it has vertical upper and lower pressing dies arranged opposite one another, and a mold table that is axially movable relative to the pressing die and supports a mold with a mold chamber through which the pressing dies can move. During a working stroke of the press, in which the mold chamber is closed from below by an upper surface of the lower pressing die, the lower part of the block casing is inserted by hand into the mold chamber, then a filling slider which is downwardly open and contains the filling material displaces during a further working stroke to a region above an upper surface of the mold so that the filling material falls into the mold chamber, and finally the upper part of the block casing is placed by hand onto the filing material and compressed by simultaneous raising of the mold table and the lower pressing die. In connection with this, either the filling material is first somewhat compressed in the mold before application of the upper part of the block casing and only after this the upper part is applied by hand, or the lower surface of the upper pressing die is provided with a holding template in which the upper part can be inserted in a position suitable for its treatment. The thus pressed block is then released by upwardly displacing the lower pressing die so that its pressing surface is flush with the upper surface of the mold, and then removed from the pressing surface by hand.

The above described method utilizes manual labor and therefore is time-consuming and expensive. Moreover, the insertion of the parts of the block casing by a worker requires his high concentration to prevent accidents. The known method is not suitable for manufacturing the blocks in great volumes required by wear-reducing properties of these blocks.

SUMMARY OF THE INVENTION

Accordingly, it is an object of the present invention to provide a method of and an arrangement for manufacturing enclosed blocks, which avoid the disadvantages of the prior art.

More particularly, it is an object of the present invention to provide a method of and an arrangement for manufacturing enclosed blocks, in accordance with which the blocks can be produced automatically without manual labor.

In keeping with these objects and with others which will become apparent hereinafter, one feature of the present invention resides, briefly stated, in a method having an operation which is cyclically repeated in synchronism with a working stroke of a press and includes automatically inserting upper and lower parts of a block casing above and below pushing means into inserting means between upper and lower pressing dies of the press, displacing by the pushing means the lower part of the block casing in a chamber of a mold towards the lower pressing die and the upper part of the block casing towards the upper pressing die, for automatically releasable holding on the latter, and withdrawing the inserting means from a pressing region between the upper and lower pressing dies before a pressing step.

When the method is carried out in accordance with the present invention, the insertion means provided with the pushing means automatically bring the upper and lower parts of the block casing in a position required for the pressing step, so that manual action is eliminated and a faster and undisturbed working stroke of the press is guaranteed. In addition to reduction of manufacturing expenses achieved, a worker for the press is no longer needed and therefore accident danger is excluded.

In accordance with another advantageous feature of the inventive method, the lower and upper parts of the block casing are supplied into the inserting means from a magazine. Thereby after charging the inserting means, the upper and lower parts of the block casing are always available synchronously with the working stroke, so that a faster working stroke can be performed in a simple manner.

Still another advantageous feature of the inventive method is that the upper and lower parts of the block housing are supplied into the inserting means from opposite sides of the latter. Thereby the upper part and the lower part are introduced into the inserting means in spatially separated regions so as not to disturb the respective opposite working steps.

A further advantageous feature of the present invention which provides for a simple operational and process course is that the lower and upper parts of the block casing are introduced into the pressing region when the inserting means is withdrawn from the latter, and thereafter the inserting means is inserted into the pressing region.

Finally, still a further advantageous feature of the inventive method is that prior to the introduction of the inserting means into the pressing region, the lower pressing die is displaced in the mold chamber so that an upper surface of the lower pressing die is flush with an upper surface of the mold, and retracting of the lower and upper part of the block casing is performed immediately after moving back of the lower pressing die from the upper surface or raising of the mold table, after the insertion of the inserting means into the pressing region.

Another feature of the present invention is an arrangement for manufacturing blocks in a press having upper and lower pressing dies, an axially movable mold table, and a mold with a mold chamber through which the pressing die moves, wherein the arrangement has inserting means movable into a pressing region between upper and lower pressing dies in a direction transverse to the axis of the pressing dies and arranged so that upper and lower parts of the block casing can be inserted into the inserting means, pushing means provided in the inserting means and arranged to displace the upper and lower casing parts toward the upper and lower pressing dies, and holding means arranged to hold the upper part of the block casing on the pressing die and automatically to release the same during pressing.

Such an arrangement in which blocks having the casings are manufactured fully automatically possess the advantage that it can be easily utilized in a conventional block making press.

Another advantageous feature of the inventive arrangement in the sense of its design is that the pushing means includes pressure medium operated cylinder-and-piston units with upper and lower pistons engaging with and displacing the upper and lower parts of the block casing.

Since the casing of blocks which are utilized for converters is composed of sheet metal, it is advantageous when the holding means on the upper pressing die is advantageously formed as a magnetic plate. Alternatively, it is also possible to form the holding means on the upper pressing die as a mechanical holder. It works as a holding template from which the upper part pressed during the pressing step of the block is released.

A further structural feature of the inventive arrangement is that the inserting means is provided on at least one of its sides parallel to the displacing direction, with at least one charging opening for upper and lower parts of the block casing supplied from a magazine. It is advantageous when the charging openings are provided at both end sides for the upper and lower parts of the casing, respectively. In this case the upper and lower parts can be displaced in a simple manner during the operation into the inserting means.

Since the pushing means is operative at both sides, or in other words acts toward the upper and lower pressing dies, it is advantageous when the pushing means is arranged between the upper and lower parts of the block casing in the inserting means.

Finally, when the inventive arrangement is utilized in the press and there are a filling slider movable along an upper surface of the mold transverse to the pressing die and a block gripper coupled with the filling slider, the inserting means is arranged so that it is insertable between the filling slider and the block gripper. In this construction the operational course of the inserting means is especially advantageous to integrate the working cycle of the press.

The novel features of the present invention are set forth in particular in the appended claims. The invention itself, however, will be best understood from the following description of a preferred embodiment which is accompanied by the following drawing.

DESCRIPTION OF A PREFERRED EMBODIMENT

Figure 1:
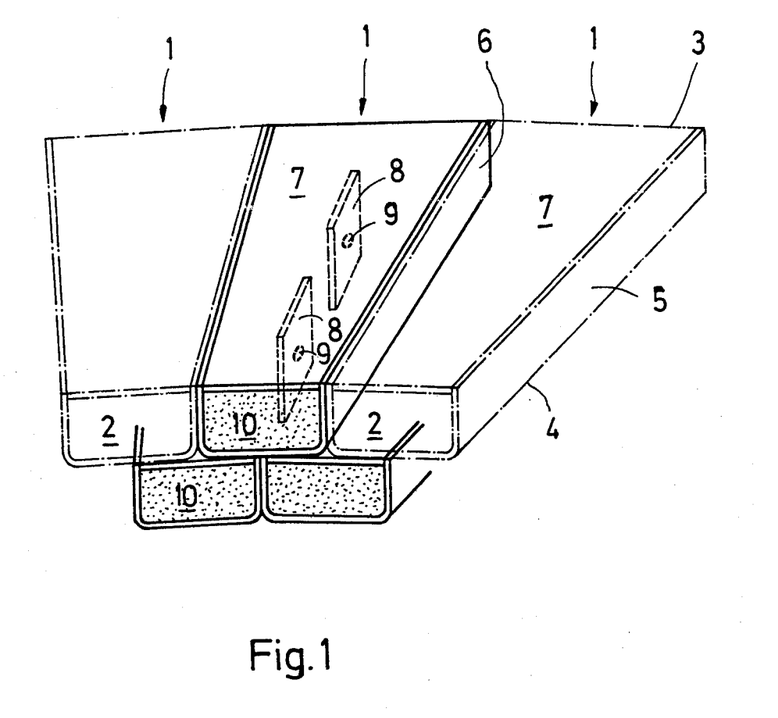
FIG. 1 is a fragmentary perspective view of enclosed blocks forming a part of a lining of a converter.

FIG. 1 shows a part of a lining of a converter for making steel from crude iron. The lining is composed of a plurality of refractory blocks 1 which are arranged in rows in offset relationship, so as to form a compact wall. The converter partially shown in FIG. 1 has a round shape in the plane view, as a rule, so that the blocks are somewhat wedge-shaped in correspondence with this round shape. The conically decreased sides of the blocks face toward the melting chamber of the converter. With the exception of the conically decreased side 2 and the conically increased side 3, other sides of the blocks are closed by a casing which has a U-shaped lower part 4 with side walls 5 and 6, and an upper part 7 connecting the side walls with one another. The casing is composed from a sheet metal.

For guaranteeing a connection between the upper part 4 and the lower part 7 of the pressed block 1, anchoring elements 8 are welded on the upper part 7 and extend toward the lower part 4. The anchoring elements 8 are provided with openings 9 or projecting formations. This provides for a firm connection with a pressing material 10 which fills the interior of the casing, for example a ceramic pressing material.

Figure 2:
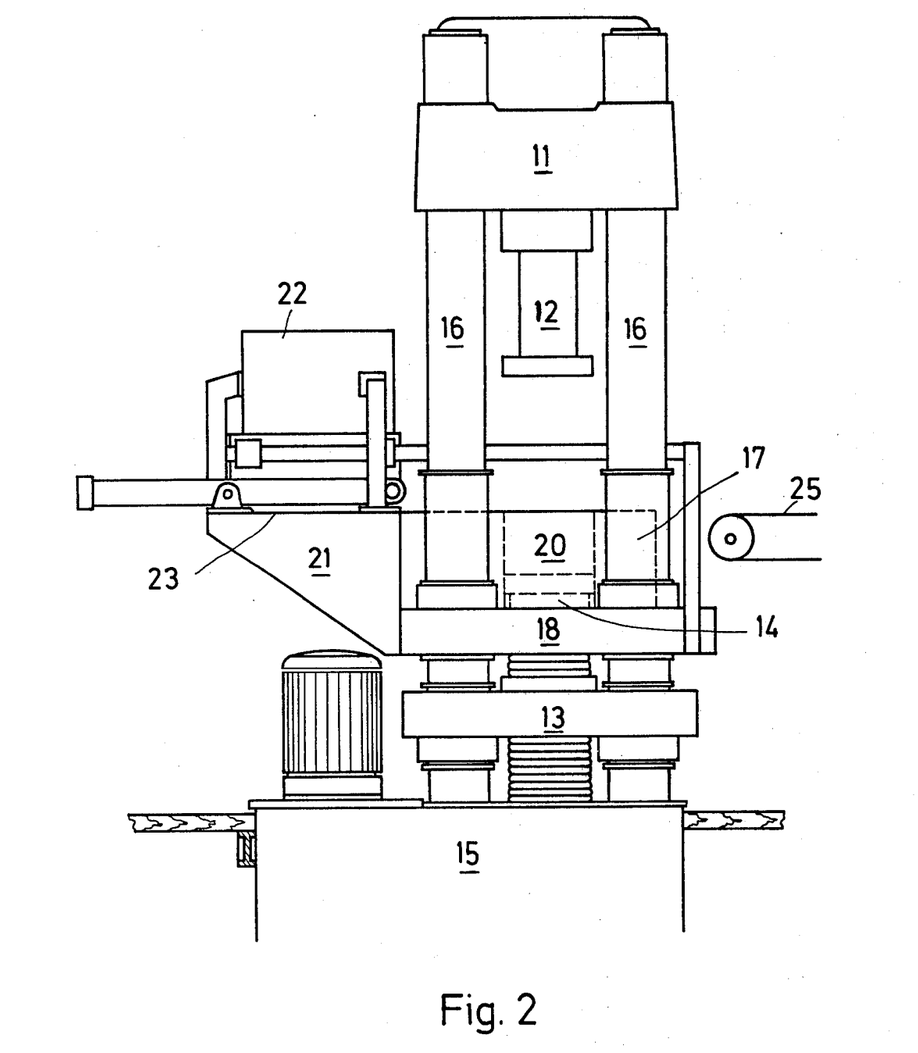
FIG. 2 is a front elevational view of a press in which an arrangement in accordance with the instant invention is installed, and a method in accordance with the instant invention is performed, for manufacturing enclosed blocks.

A press for manufacturing the block 1 is shown in FIG. 2 and has an upper pressing die 12 supported on a press crossbar 11, and a lower pressing die carried by a press table 13. The press table 13 is movable by a pressure-medium operated drive along columns 16 which are connected at their foot end with a bottom plate 15 and at their head end with the cross bar 11 and extend vertically.

A mold table 18 which carries a mold 17 is also movable by a pressure-medium operated drive along the columns 16 and arranged between the press table 13 and the crossbar 11. The mold table 18 has a through going opening 19 through which the lower pressing die 14 moves in a mold chamber 20. The mold chamber 20 is formed in the mold 17 and has end sides which are open toward the upper and lower pressing dies 12 and 14.

A filling slider 22 is arranged on a support 21 located laterally on the mold table 18 and is displaceable transverse to the pressing dies 12 and 14. The filling slider 22 is formed as a material container provided for accommodating a pressing material 24 and having an upper lower side 23 which faces toward the mold 17. A transporting band 25 for withdrawing the manufactured blocks 1 is arranged at the press side opposite the support 21.

Figure 3:
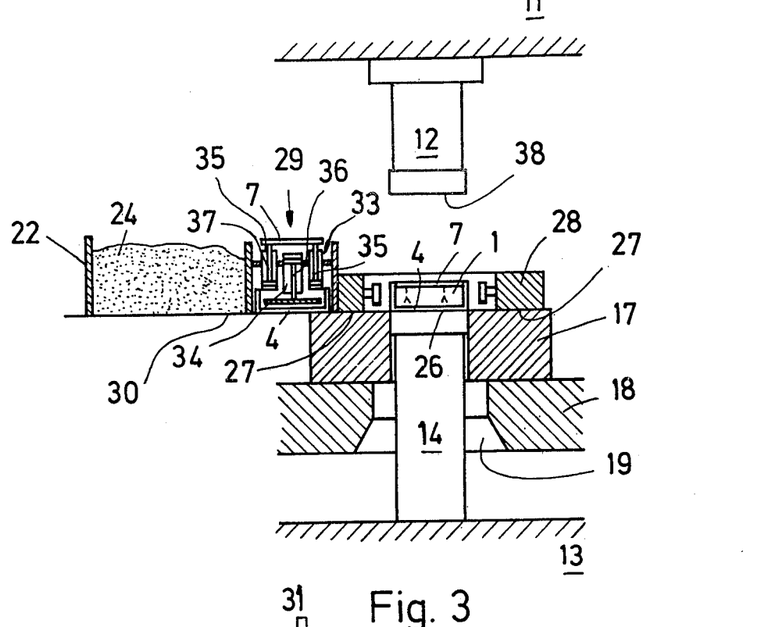
FIG. 3 is a fragmentary sectional view, showing the press at the start.

Manufacturing of the blocks 1 is performed in accordance with a method which is schematically shown in FIGS. 3-10, wherein FIG. 3 shows the press in the initial position of its cyclical working process.

In this initial position, the material container or filling slider 22 is charged with the pressing material 24 and the lower pressing die 14 is inserted into the mold chamber 20 so that a pressing surface 26 of the lower pressing die is flush with an upper surface 27 of the mold 17, the pressing surface 26 and the upper surface 27 facing toward the upper pressing die 12. An inserting device 29 for the casing of the block 1 is brought between the filling slider 22 and a block gripper 28 connected therewith.

In this initial position of the press, in which the pressing cycle is finished, lies the manufactured block with its casing assembled from the upper and lower parts 7 and 4 open and ready to grip at the height of the upper surface 27 of the mold 17. For adjusting this position, the mold table 18 with the mold 17 and the support 21, which forms with the upper surface 27 of the mold 17 a flush displacing surface 30 for the filling slider 22, must be lower by the height of the manufactured block 1. This is performed by a downward displacement of the press table 13 with the mold table 18 and the support 21. While in the shown embodiment the upper pressing die is immovable, in other systems the lower pressing die 14 is formed stationary or both pressing dies 12 and 14 are displaceable.

Figure 4:
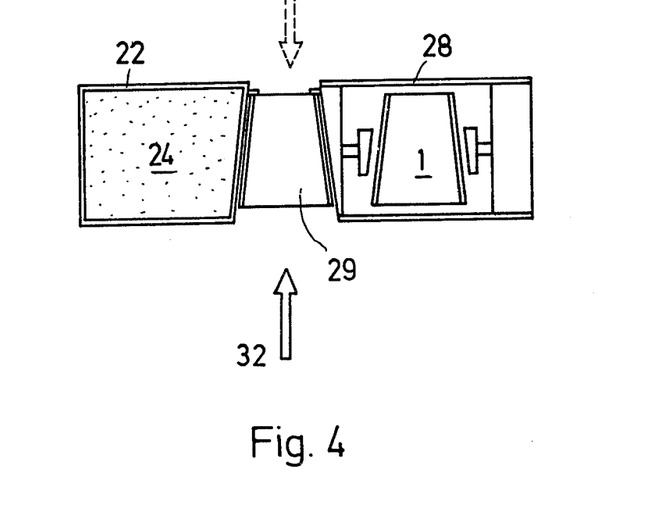
FIG. 4 is a plan view thereof.

FIG. 4 shows the initial position of the press in plan view. The lower part 4 and the upper part 7 of the block casing are moved in directions of the arrows 31 and 32 in the inserting device 29 which is advantageously arranged between the filling slider 22 and the block gripper 28 connected therewith. The insertion of the lower part 4 and the upper part 7 is performed from not shown lateral cassette magazines hydraulically, pneumatically or mechanically. The lower part 4 can be inserted into the inserting device from one side of the press, and the upper part 7 can be inserted into the same from the other side of the press, to satisfy strict requirements to space consumption.

The inserting device 29 further has a pushing device 33 for the lower part 4 and the upper part 7. The pushing device 33 is composed of several pressure-medium operated cylinder-and-piston units with cylinders 34 and 35 and pistons 36 and 37 engaging with the lower part 4 and the upper part 7, so that the latter can be displaced in direction toward the neighboring pressing dies 12 and 14.

Figure 5:
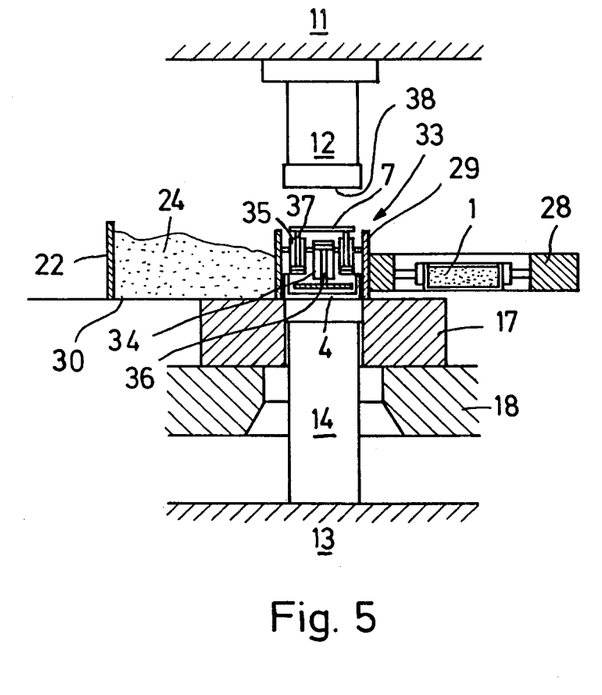
FIG. 5 is a fragmentary sectional view, similar to FIG. 3, but showing an other step of the method.

In FIG. 5 the inserting device 29 loaded with the lower part 4 and the upper part 7 is displaced to its unloading position between the lower and upper pressing dies 14 and 12 in the thus formed pressing region. The block gripper 28 is somewhat raised relative to the mold 17.

Figure 6:
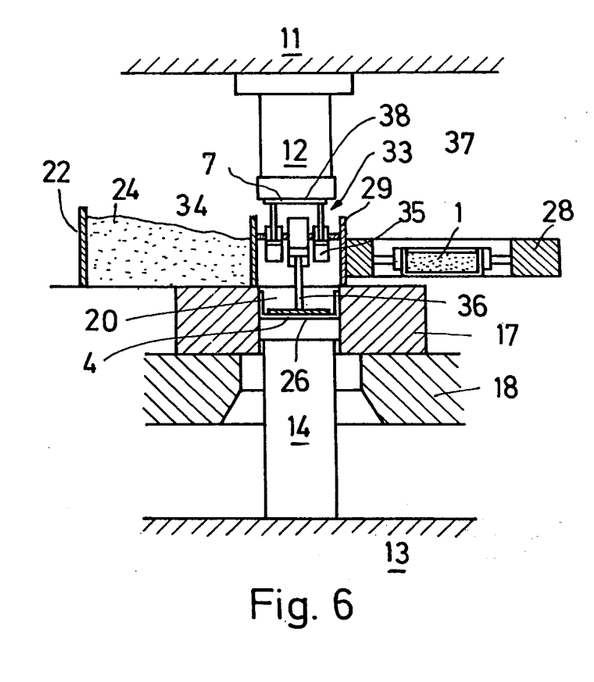
FIGS. 6-10 are views similar to FIG. 5, but showing different succeeding steps.

In the next step shown in FIG. 6, the mold table 18 with the mold 17, as well as the filling slider 22, the inserting device 29 and the block gripper 28 with the finally pressed block 1 are lifted, so that the required mold chamber 20 is again formed for a next block 1 to be pressed. Immediately after this, the pushing device 33 is brought to operation and pushes with the cylinder 34 and the piston 36 the U-shaped lower part 4 from the mold chamber bottom formed by the pressing surface 26 of the lower pressing die 14. At the same time the pushing device 33 pushes with the cylinder 35 and the piston 37 the upper part 7 against the pressing surface 38 of the upper pressing die 12. Alternatively to this raising of the mold table, the lower pressing die 14 can be retracted relative to the mold 17 for forming the mold chamber 20.

Figure 7:
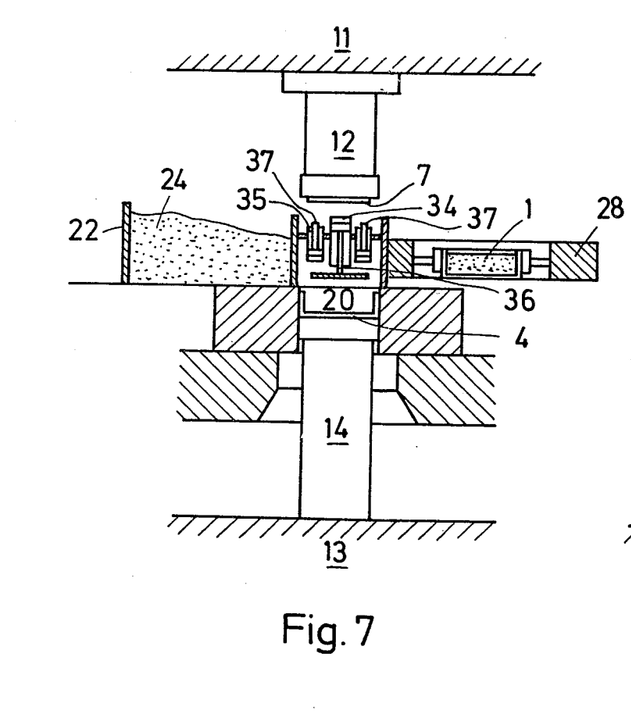

FIG. 7 shows a further step of the manufacturing process of the block 1. The pistons 36 and 37 of the cylinders 34 and 35 are further retracted. The upper part 7 is held on the upper pressing die 12 by a magnetic force or with the air of other mechanical holders.

Figure 8:
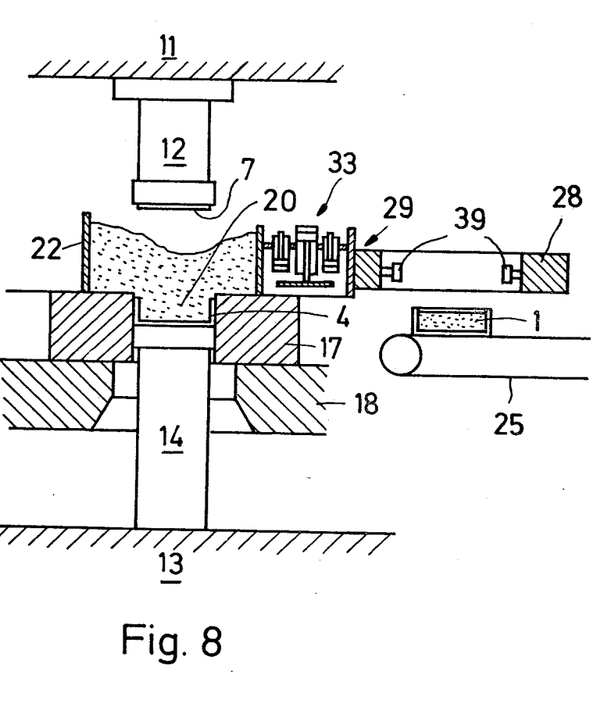

Finally, the filling slider 22, the inserting device 29 and the block gripper 28 are further displaced, as shown in FIG. 8, and the filling slider is retained approximately centrally to the mold chamber 20. During this movement the ceramic pressing material 24 falls into the mold chamber 20 and the block gripper 28 opens its holding device 39, so that the block produced in the preceding step falls onto the running conveyor band 25.

Figure 9:
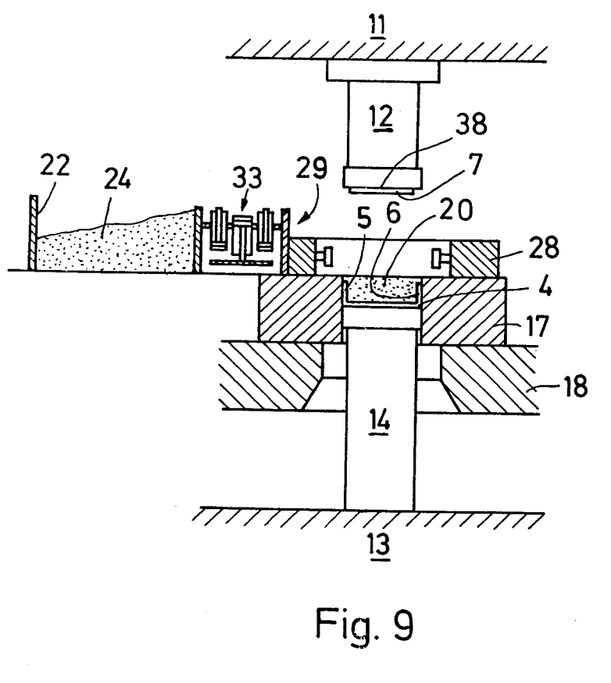

For improving the distribution of the ceramic material in the mold chamber 20, the filling slider 22 can reciprocate or also be identically retracted. The press is now available for the pressing process as shown in FIG. 9.

Figure 10:
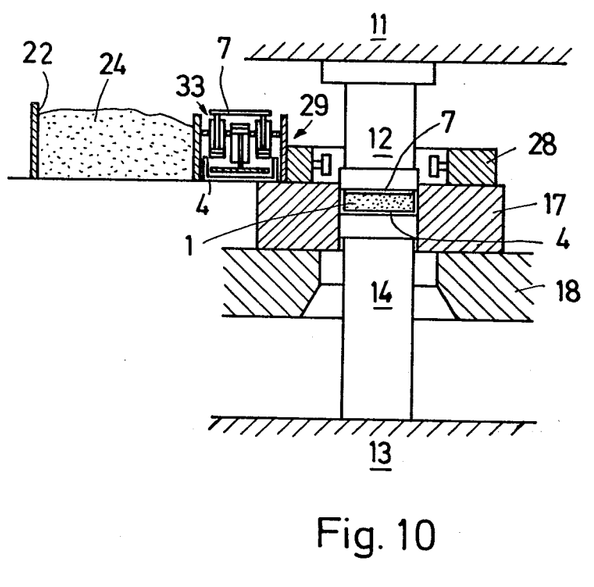

The mold table 18 and the press table 13 are further displaced together upwardly under the action of the hydraulic drive, so that the upper pressing die 12 with the upper part 7 is introduced into the mold chamber 20 to such extent until it abuts against the free ends of the walls 5 and 6 of the U-shaped lower part 4 or it attains a predetermined resistance, the upper pressing die 12 is released and the lower part 4 with the upper part 7 form together the casing of the block 1 in its closed form, as can be seen in FIG. 10. At this point the manufacturing cycle is repeated.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. Apparatus for manufacturing blocks having a casing assembled from upper and lower parts and filled with a filling material to be pressed in a press having upper and lower pressing dies with an axis and a mold supported on an axially movable mold table and having a mold chamber through which the pressing dies can move, comprising inserting means movable into a pressing region between upper and lower pressing dies in a direction transverse to the axis of the pressing dies and so arranged that upper and lower parts of a block casing can be inserted into the inserting means, pushing means provided in said inserting means and arranged to displace the upper and lower casing parts towards the upper and lower pressing dies, and holding means arranged to hold the upper part of the block casing on the upper pressing die and automatically to release the same during pressing.

2. Apparatus defined in claim 1, wherein the pushing means includes cylinder-and-piston units with pistons arranged to displace the upper and lower parts of the block casing.

3. Apparatus defined in claim 1, wherein the holding means includes a magnetic plate arranged to be mounted on the upper pressing die.

4. Apparatus defined in claim 1, wherein the holding means includes a mechanical holder arranged to be mounted on the upper pressing die.

5. Apparatus defined in claim 1, wherein the pushing means is located in the inserting means between the upper and lower parts of the block casing.

6. Apparatus defined in claim 1, wherein the press has a filling slider movable along an upper surface of the mold transverse to the pressing dies, and a block gripper coupled with the filling slider, the inserting means being arranged so that it is insertable between the filling slider and the block gripper.

7. Apparatus defined in claim 1, wherein the press has a filling slider movable along an upper surface of the mold transverse to the pressing dies and having a front side as considered in a direction of its movement into the pressing region, the inserting means being arranged so that it is located at the front side of the filling slider.

8. Apparatus defined in claim 1, wherein the inserting means has end surfaces extending parallel to a direction of its movement into the pressing region, the inserting means being provided in at least one of the end surfaces with at least one charging opening for receiving the parts of the block casing from supply means.

9. Apparatus defined in claim 8, wherein the inserting means has a second such charging opening provided in the other of the end surfaces, one of the charging openings being arranged for receiving the lower part of the block casing, whereas the other of the charging openings is arranged for receiving the other of the parts of the block casing.

* * * * *